US011938570B2

(12) United States Patent
Nomaru (10) Patent No.: US 11,938,570 B2
(45) Date of Patent: Mar. 26, 2024

(54) LASER PROCESSING APPARATUS (71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 860 days.

(21) Appl. No.: 17/024,871

(22) Filed: Sep. 18, 2020

(65) Prior Publication Data
US 2021/0094128 A1  Apr. 1, 2021

(30) Foreign Application Priority Data

Sep. 27, 2019  (JP) .................. 2019-177344

(51) Int. Cl.
*B23K 26/53* (2014.01)
*B23B 31/30* (2006.01)
(Continued)

(52) U.S. Cl.
CPC ............ *B23K 26/53* (2015.10); *B23B 31/307* (2013.01); *B23K 26/0006* (2013.01); *B23K 26/032* (2013.01); *B23K 26/04* (2013.01); *B23K 26/064* (2015.10); *B23K 26/0648* (2013.01); *B23K 26/067* (2013.01); *B23K 26/0853* (2013.01); *B23K 26/0876* (2013.01);
(Continued)

(58) Field of Classification Search
CPC .... B23K 26/53; B23K 26/064; B23K 31/307; B23K 26/0006; B23K 26/032; B23K 26/04; B23K 26/0648; B23K 26/067; B23K 26/0853; B23K 26/0876; B23K 26/38; B23K 26/402; B23K 2101/40; B23K 37/0408
See application file for complete search history.

(56) References Cited

U.S. PATENT DOCUMENTS

| 2013/0027690 A1* | 1/2013 | Nomaru | ............... | B23K 26/046 |
| | | | | 356/121 |
| 2018/0136418 A1* | 5/2018 | Butler | .................... | G02B 6/325 |
| 2021/0394306 A1* | 12/2021 | Yada | ...................... | B23K 26/03 |

FOREIGN PATENT DOCUMENTS

| JP | 2002192370 A | 7/2002 |
| JP | 2004188475 A | 7/2004 |

(Continued)

OTHER PUBLICATIONS

JP2011122894A Translation (Year: 2023).*

*Primary Examiner* — Nathaniel E Wiehe
*Assistant Examiner* — Keith Brian Assante
(74) *Attorney, Agent, or Firm* — Greer, Burns & Crain, Ltd.

(57) ABSTRACT

A laser beam applying unit of a laser processing apparatus includes a beam splitter disposed on a first optical path connecting a laser oscillator and a condenser, a wide band light source disposed on a second optical path branched by the beam splitter, a spectroscope that is disposed between the wide band light source and the beam splitter and that branches the laser beam from the second optical path to a third optical path, and a Z position detection unit that is disposed on the third optical path branched by the spectroscope and that detects the position in a Z-axis direction of a workpiece according to an intensity of light corresponding to the wavelength of return light that is generated when the light of the wide band light source is condensed by the condenser and is reflected by the workpiece held by a chuck table.

5 Claims, 5 Drawing Sheets (51) Int. Cl.
  *B23K 26/00*  (2014.01)
  *B23K 26/03*  (2006.01)
  *B23K 26/04*  (2014.01)
  *B23K 26/06*  (2014.01)
  *B23K 26/064* (2014.01)
  *B23K 26/067* (2006.01)
  *B23K 26/08*  (2014.01)
  *B23K 26/38*  (2014.01)
  *B23K 26/402* (2014.01)
  *B23K 37/04*  (2006.01)
  *B23K 101/40* (2006.01)

(52) U.S. Cl.
  CPC ............ *B23K 26/38* (2013.01); *B23K 26/402* (2013.01); *B23K 37/0408* (2013.01); *B23K 2101/40* (2018.08)

(56) References Cited

FOREIGN PATENT DOCUMENTS

JP    2011122894 A  *  6/2011
JP    2012002604 A     1/2012

* cited by examiner

Z coordinate table — 110

| Wavelength (nm) | Z coordinate (μm) |
|---|---|
| 200 | +15.0 |
| 250 | +12.5 |
| 300 | +10.0 |
| 350 | +7.5 |
| 400 | +5.0 |
| 450 | +2.5 |
| 500 | 0.0 |
| 550 | −2.5 |
| 600 | −5.0 |
| 650 | −7.5 |
| 700 | −10.0 |
| 750 | −12.5 |
| 800 | −15.0 |

FIG.6B

Coordinate storage section — 120

| | | |
|---|---|---|
| X1, y1, Z11 | X1, y2, Z12 | ........ |
| X2, y1, Z21 | X2, y2, Z22 | ........ |
| X3, y1, Z31 | X3, y2, Z32 | ........ |
| X4, y1, Z41 | X4, y2, Z42 | ........ |
| ⋮ | ⋮ | |

LASER PROCESSING APPARATUS

BACKGROUND OF THE INVENTION

Field of the Invention

The present invention relates to a laser processing apparatus for applying a laser beam to a workpiece held by a chuck table to process the workpiece.

Description of the Related Art

A wafer formed with a plurality of devices such as integrated circuits (ICs) and large scale integrations (LSIs) formed on a front surface thereof while being partitioned by a plurality of intersecting streets is divided into individual device chips by a laser processing apparatus, and the thus divided device chips are used for electric apparatuses such as mobile phones and personal computers.

The laser processing apparatus includes a chuck table that holds a workpiece, a laser beam applying unit that applies a laser beam to the workpiece held by the chuck table to process the workpiece, an X-axis feeding mechanism that performs processing feeding of the chuck table and the laser beam applying unit in an X-axis direction, a Y-axis feeding mechanism that performs processing feeding of the chuck table and the laser beam applying unit in a Y-axis direction, and a control unit, and can process the wafer with high accuracy.

In addition, the laser beam applying unit constituting the laser processing apparatus includes one of a type in which a laser beam of such a wavelength as to be absorbed in a workpiece is applied to subject an upper surface of the workpiece to ablation processing (see, for example, Japanese Patent Laid-Open No. 2004-188475); and one of a type in which a laser beam of such a wavelength as to be transmitted through a workpiece is applied to the inside of the workpiece to form a modified layer (see, for example, Japanese Patent No. 3408805).

Particularly, in the type of forming the modified layer inside the workpiece, it may be impossible to form the modified layer at a desired inside position of the wafer, due to variability in thickness or undulation of the wafer. In view of this, a technology of measuring the height of an upper surface or a lower surface of the wafer by a measuring instrument and positioning a condensing point of the laser beam at an appropriate inside position of the wafer has been proposed (see Japanese Patent Laid-Open No. 2012-002604).

SUMMARY OF THE INVENTION

In the technology described in Japanese Patent Laid-Open No. 2012-002604, light having a predetermined wavelength region is applied to the workpiece, and a spectral interference waveform is obtained from the reflected light reflected by the workpiece, thereby detecting the height of a wafer which is the workpiece. However, in the case of measuring the height of the wafer by use of the spectral interference waveform, there is a problem that the measuring accuracy is low, since a spectral interference waveform generated by a laminated matter on the upper surface of the wafer serves as disturbance. In addition, the measurement using the spectral interference waveform requires application of light to a comparatively wide measuring region, and it is difficult to perform a highly accurate measurement on a pinpointed basis in a narrow region.

Accordingly, it is an object of the present invention to provide a laser processing apparatus which is able to properly measure the height of a workpiece and to perform laser processing at a desired position.

In accordance with an aspect of the present invention, there is provided a laser processing apparatus including a chuck table that holds a workpiece, a laser beam applying unit that applies a laser beam to the workpiece held by the chuck table to process the workpiece, an X-axis feeding mechanism that performs relative processing feeding of the chuck table and the laser beam applying unit in an X-axis direction, a Y-axis feeding mechanism that performs relative processing feeding of the chuck table and the laser beam applying unit in a Y-axis direction orthogonal to the X-axis direction, and a control unit. The laser beam applying unit includes a laser oscillator that oscillates laser, a condenser that condenses the laser beam emitted from the laser oscillator onto the workpiece held by the chuck table at any position in a Z-axis direction orthogonal to the X-axis direction and the Y-axis direction, a beam splitter disposed on a first optical path connecting the laser oscillator and the condenser, a wide band light source disposed on a second optical path branched by the beam splitter, a spectroscope that is disposed between the wide band light source and the beam splitter and that branches from the second optical path to a third optical path, a Z position detection unit that is disposed on the third optical path branched by the spectroscope and that detects a Z position in the Z-axis direction of the workpiece according to an intensity of light corresponding to a wavelength of return light that is generated when the light from the wide band light source is condensed by the condenser and is reflected by the workpiece held by the chuck table, and a condenser moving mechanism that moves the condenser in the Z-axis direction according to the Z position.

Preferably, the second optical path includes an optical fiber, the light from the wide band light source is guided by the optical fiber, the light applied from an end face of the optical fiber is guided through a collimate lens to the beam splitter that transmits the light, a gap adjusting mechanism for adjusting a gap between the end face of the optical fiber and the collimate lens is disposed in the second optical path, and a condensing position of the light of the wide band light source condensed by the condenser is adjusted by the gap adjusting mechanism.

Preferably, the laser oscillator oscillates laser of such a wavelength as to be transmitted through the workpiece, and the condenser positions a condensing point inside the workpiece to form a modified layer.

Preferably, the control unit includes a coordinate storage section that stores the Z position in the Z-axis direction of the workpiece detected by the Z position detection unit in a Z-axis coordinate together with X-axis and Y-axis coordinates, and the control unit controls the condenser moving mechanism, based on the coordinates stored in the coordinate storage section, to process the workpiece held by the chuck table.

Preferably, the control unit controls the condenser moving mechanism following up to the Z position in the Z-axis direction detected by the Z position detection unit, to process the workpiece held by the chuck table.

According to the present invention, a plurality of condensing points corresponding to a plurality of wavelengths contained in the light emitted by the wide band light source is applied to the workpiece, and the height is measured according to the intensity of the light of the wavelength at which the condensing point conforms to the workpiece.

Therefore, a proper height measurement is possible, even when a laminated matter is present on the wafer upper surface, and measuring accuracy is enhanced, without generation of disturbance as in the case of a spectral interference waveform. In addition, since the height of a position focused is measured, measurement on a pinpointed basis in a narrow region such as a street can be performed.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
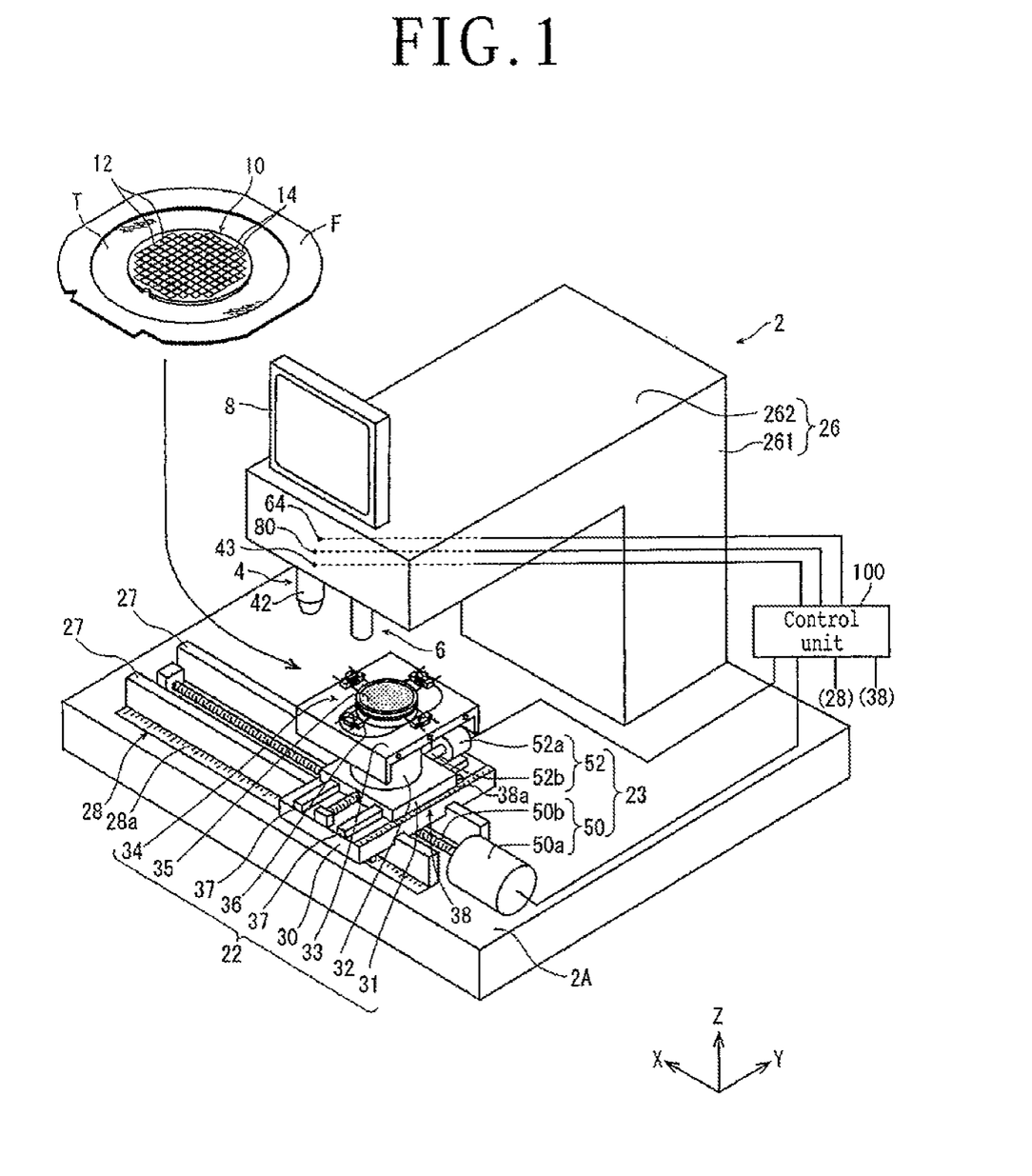
FIG. 1 is a general perspective view of a laser processing apparatus according to an embodiment of the present invention.

A laser processing apparatus according to embodiments of the present invention will be described in detail below, referring to the attached drawings. FIG. 1 depicts a general perspective view of a laser processing apparatus 2 according to the present embodiment. The laser processing apparatus 2 includes a laser beam applying unit 4 as processing means that is disposed on a base 2A and that applies a laser beam to a plate-shaped workpiece, a holding unit 22 that holds the plate-shaped workpiece, an imaging unit 6 that images the workpiece held by the holding unit 22, a feeding mechanism 23 that performs relative processing feeding of the laser beam applying unit 4 and the holding unit 22 and that relatively moves the imaging unit 6 and the holding unit 22, and a frame body 26 including a vertical wall section 261 erected on a lateral side of the feeding mechanism 23 on the base 2A and a horizontal wall section 262 extending in a horizontal direction from an upper end portion of the vertical wall section 261.

An optical system (to be detailed later) including the laser beam applying unit 4 is accommodated inside the horizontal wall section 262 of the frame body 26. A condenser 42 constituting a part of the laser beam applying unit 4 is disposed on a lower surface side of a tip portion of the horizontal wall section 262, and the imaging unit 6 is disposed at a position adjacent to the condenser 42 in an X-axis direction indicated by an arrow X in the figure. A display unit 8 provided with a touch panel function for displaying the processing conditions of the laser processing apparatus 2 and for the operator to input the processing conditions therethrough is disposed on an upper side of the horizontal wall section 262. Note that a plane defined by the X-axis direction and a Y-axis direction is substantially horizontal.

As illustrated in FIG. 1, the holding unit 22 includes a rectangular X-axis direction movable plate 30 mounted on the base 2A such as to be movable in the X-axis direction, a rectangular Y-axis direction movable plate 31 mounted on the X-axis direction movable plate 30 such as to be movable in the Y-axis direction, a cylindrical support column 32 fixed on an upper surface of the Y-axis direction movable plate 31, and a rectangular cover plate 33 fixed to an upper end of the support column 32. At the cover plate 33, a chuck table 34 is disposed, extending upward through a slot formed over the cover plate 33. The chuck table 34 holds a circular plate-shaped body, and is configured to be rotatable by an unillustrated rotational driving unit accommodated in the support column 32. A circular suction chuck 35 formed from a porous material having air vent holes and extending substantially horizontally is disposed on an upper surface of the chuck table 34. The suction chuck 35 is connected to suction means (not illustrated) through a passage extending through the support column 32, and four clamps 36 are disposed at intervals in the periphery of the suction chuck 35. The clamps 36 grip an annular frame when the plate-shaped body held through the frame is fixed to the chuck table 34.

The feeding mechanism 23 includes an X-axis feeding mechanism 50 and a Y-axis feeding mechanism 52. The X-axis feeding mechanism 50 converts rotational motion of a motor 50a into a rectilinear motion through a ball screw 50b, transmits the rectilinear motion to the X-axis direction movable plate 30, and advances and retracts the X-axis direction movable plate 30 in the X-axis direction along guide rails 27 on the base 2A. The Y-axis feeding mechanism 52 convers rotational motion of a motor 52a into a rectilinear motion through a ball screw 52b, transmits the rectilinear motion to the Y-axis direction movable plate 31, and advances and retracts the Y-axis direction movable plate 31 in the Y-axis direction along guide rails 37 on the X-axis direction movable plate 30.

The laser processing apparatus 2 according to the present embodiment includes X-axis direction feeding amount detection means 28 for detecting the feeding amount (X coordinate position) in the X-axis direction of the chuck table 34. The X-axis direction feeding amount detection means 28 includes a linear scale 28a disposed along the guide rail 27, and a reading head (omitted from illustration) that is disposed on the lower surface side of the X-axis direction movable plate 30 and that moves along the linear scale 28a together with the X-axis direction movable plate 30. The reading head of the X-axis direction feeding amount detection means 28 sends to a control unit 100 a pulses signal of one pulse per 1 µm in the present embodiment.

Further, the laser processing apparatus 2 includes a Y-axis direction feeding amount detection means 38 for detecting the Y-axis feeding amount (Y coordinate position) in the Y-axis direction of the Y-axis direction movable plate 31. The Y-axis direction feeding amount detection means 38 includes a linear scale 38a disposed along the guide rail 37 disposed on the X-axis direction movable plate 30 and extending in the Y-axis direction, and a reading head (omitted from illustration) that is disposed on the lower surface side of the Y-axis direction movable plate 31 and is moved along the linear scale 38a together with the Y-axis direction movable plate 31. Similarly to the X-axis direction feeding amount detection means 28, the Y-axis direction feeding amount detection means 38 sends to the control unit 100 a pulsed signal of one pulse per 1 μm. The control unit 100 detects the Y coordinate position of the chuck table 34 by counting the pulsed signal inputted thereto. While the X coordinate and Y coordinate positions of the chuck table 34 of the holding unit 22 are accurately detected by the X-axis direction feeding amount detection means 28 and the Y-axis direction feeding amount detection means 38, the chuck table 34 can be moved relative to the imaging unit 6 and the laser beam applying unit 4 and positioned at a desired position.

The imaging unit 6 images the plate-shaped body held by the chuck table 34 constituting the holding unit 22, and is used for alignment to align the condenser 42 of the laser beam applying unit 4 with a processing region of the plate-shaped body.

The laser processing apparatus 2 includes the control unit 100. The control unit 100 includes a computer, and includes a central processing unit (CPU) for performing arithmetic processing according to a control program, a read only memory (ROM) for storing the control program and the like, a random access memory (RAM) capable of reading and writing for temporarily storing detection values, calculation results and the like, an input interface, and an output interface (omitted from illustration of details). Note that, while the control unit 100 is depicted on the outside of the laser processing apparatus 2 in FIG. 1 for convenience of explanation, it is, in practice, accommodated inside the laser processing apparatus 2.

Figure 2:
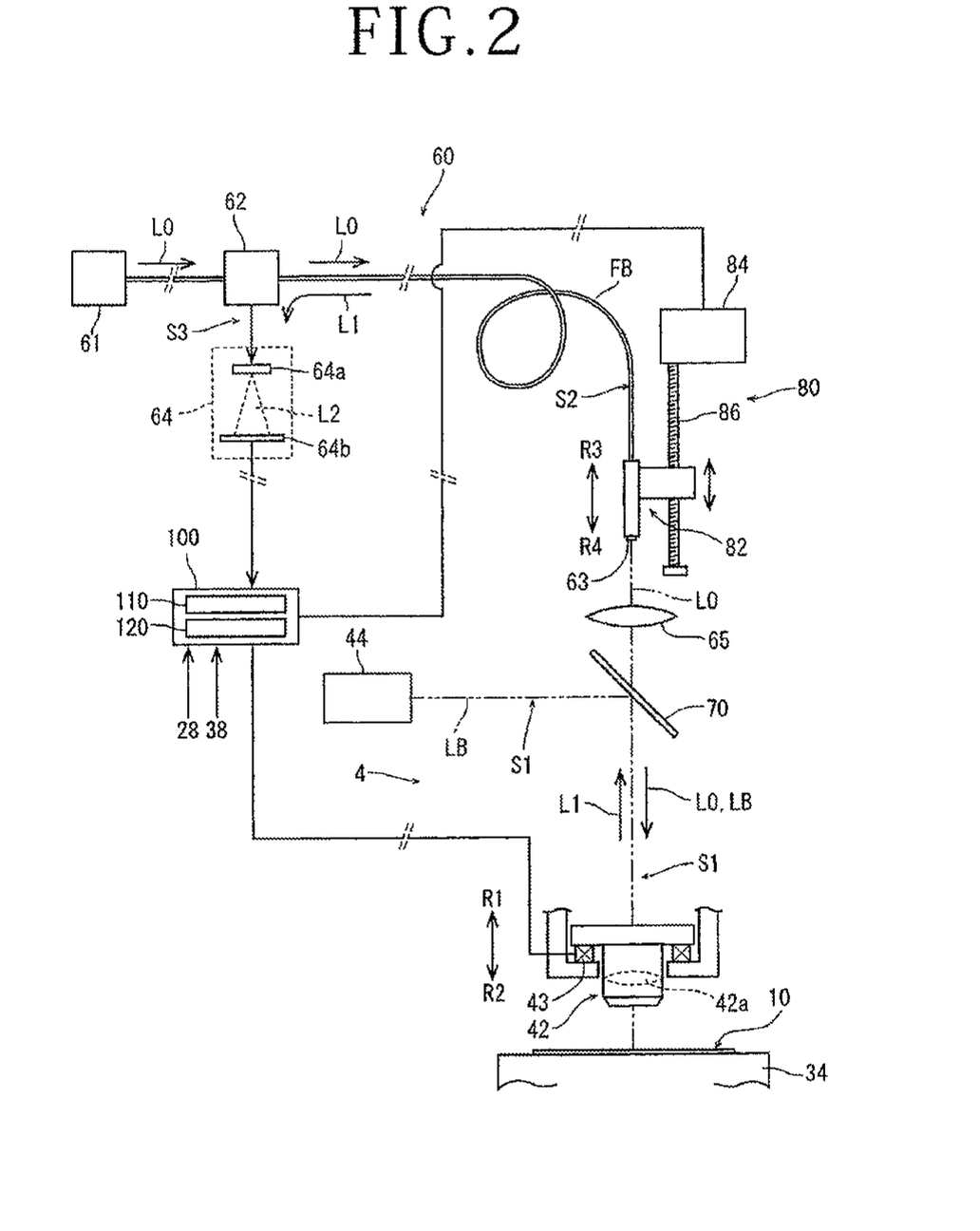
FIG. 2 is a block diagram depicting an optical system possessed by the laser processing apparatus depicted in FIG. 1.

The workpiece to be laser processed by the laser processing apparatus 2 is, for example, a semiconductor wafer 10 as depicted in FIG. 1. The wafer 10 has a plurality of devices 14 formed on a surface thereof while being partitioned by a plurality of streets 12, and is held on an annular frame F through an adhesive tape T. Referring to FIG. 2, the optical system including the laser beam applying unit 4 will be described below. Note that, for convenience of explanation, the dimensional ratios of the configurations depicted in FIG. 2 are appropriately adjusted, and are different from the actual dimensional ratios.

As illustrated in FIG. 2, the laser beam applying unit 4 includes a laser oscillator 44 that oscillates laser, a condenser 42 that condenses a laser beam LB emitted from the laser oscillator 44 to a wafer 10 held by the chuck table 34 of the holding unit 22, a beam splitter 70 disposed in a first optical path S1 connecting the laser oscillator 44 and the condenser 42, a wide band light source 61 disposed in a second optical path S2 branched by the beam splitter 70, a spectroscope 62 that is disposed between the wide band light source 61 and the beam splitter 70 and that branches from the second optical path S2 to a third optical path S3, a Z position detection unit 64 that is disposed in the third optical path S3 branched by the spectroscope 62 and that detects a Z position in the Z-axis direction, which is the surface position of the wafer 10, according to the intensity of light corresponding to the wavelength of return light L1 which is generated when light L0 of the wide band light source 61 is condensed by the condenser 42 and is reflected by the wafer 10 held by the holding unit 22, and a condenser moving mechanism 43 that moves the condenser 42 in the Z-axis direction indicated by R1 or R2 in the figure according to the Z position (Z coordinate) detected by the Z position detection unit 64. The condenser moving mechanism 43 includes, for example, a piezo element, a voice coil motor or the like, and is accurately controlled based on an instruction signal generated by the control unit 100.

The laser oscillator 44 emits the laser beam LB such as to be transmitted through the wafer 10, for example, having a wavelength of 1,340 nm. The beam splitter 70 disposed in the first optical path S1 includes, for example, a dichroic mirror. The beam splitter 70 is set in such a manner as to reflect light of a wavelength of 1,300 to 1,400 nm inclusive of the wavelength of the laser beam LB emitted from the laser oscillator 44, and to transmit light of other wavelengths. The laser beam LB reflected by the beam splitter 70 is guided to the condenser 42, and the condensing point is positioned in a predetermined inside position of the wafer 10 by a condenser lens 42a, to form a modified layer.

The above-mentioned second optical path S2 is mostly composed of an optical fiber FB. The wide band light source 61 is disposed on one end side of the second optical path S2, and wide-band light L0 generated by the wide band light source 61 may be white light containing, in a well-balanced manner, light of wavelengths in the range of 150 to 850 nm, for example. As a light source constituting the wide band light source 61, there may be adopted, for example, a halogen light source, a super luminescent diode (SLD) light source, a light-emitting diode (LED) light source, a super continuum light source, etc. The range of the wavelength of the light constituting the light L0 emitted from the wide band light source 61 is not limited to the above-mentioned range, and may be a narrower range or a wider range, and the range of the wavelength is not particularly limited.

The light L0 generated by the wide band light source 61 goes straight ahead through the spectroscope 62, and the light L0 applied from an end face 63 of the optical fiber FB is guided to a collimate lens 65 disposed on the second optical path S2. A gap adjusting mechanism 80 that supports the vicinity of the end face 63 of the optical fiber FB and adjusts the gap between the end face 63 and the collimate lens 65 is disposed on the second optical path S2. The gap adjusting mechanism 80 includes an optical fiber holder 82 that supports the vicinity of the end face 63 of the optical fiber FB, a pulse motor 84, and a ball screw 86 that transmits the rotation of the pulse motor 84 to the optical fiber holder 82 and converts the rotation into a rectilinear motion. With the pulse motor 84 rotated normally or reversely, the position of the end face 63 of the optical fiber FB can be advanced or retracted in the direction indicated by an arrow R3 or R4.

Figure 3:
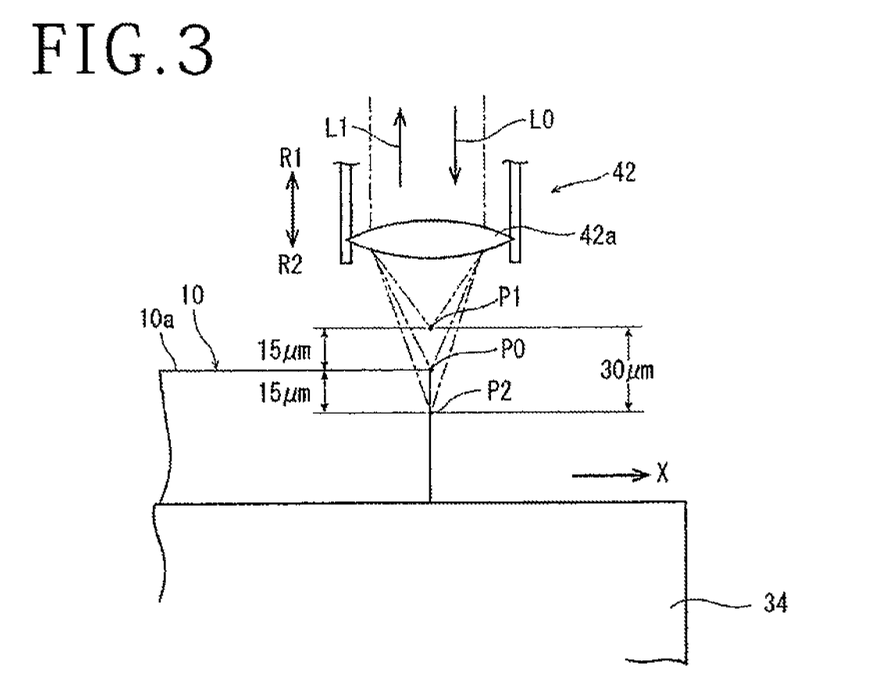
FIG. 3 is a side view depicting a manner in which a condensing point is formed at positions different on wavelength basis by a condenser lens disposed at a condenser depicted in FIG. 1.

The light L0 applied from the end face 63 of the optical fiber FB and guided to the collimate lens 65 is transmitted through the beam splitter 70 to be guided to the first optical path S1, and is guided into the condenser lens 42a disposed at the condenser 42. In the present embodiment, the condenser lens 42a is a chromatic aberration condenser lens, and the light L0 transmitted through the condenser lens 42a forms a condensing point at positions different on wavelength basis, over a predetermined range (approximately 30 μm) on the optical axis of the condenser lens 42a inclusive of the front surface of the wafer 10 held on the chuck table 34. More specifically, as depicted in FIG. 3, in the case where a condensing point P0 of the light of a wavelength of 500 nm included in the light L0 is set on the front surface 10a of the wafer 10, the condensing point of the light of a wavelength shorter than 500 nm is formed on the upper side relative to the position where the condensing point P0 of the light of a wavelength of 500 nm is formed; for example, a condensing point P1 of the light of a wavelength of 200 nm is formed at 15 μm above the position of the condensing point P0. In addition, the condensing point of the light of a wavelength longer than 500 nm is formed on the lower side relative to the position where the condensing point P0 is formed; for example, a condensing point P2 of the light of a wavelength of 800 nm is formed at 15 μm below the position of the condensing point P0. In other words, by the action of the condenser lens 42*a*, the condensing point of the light L0 generated by the wide band light source 61 is formed in the range of approximately −15 to +15 μm, with reference to the position of the upper surface of the wafer 10.

Figure 4:
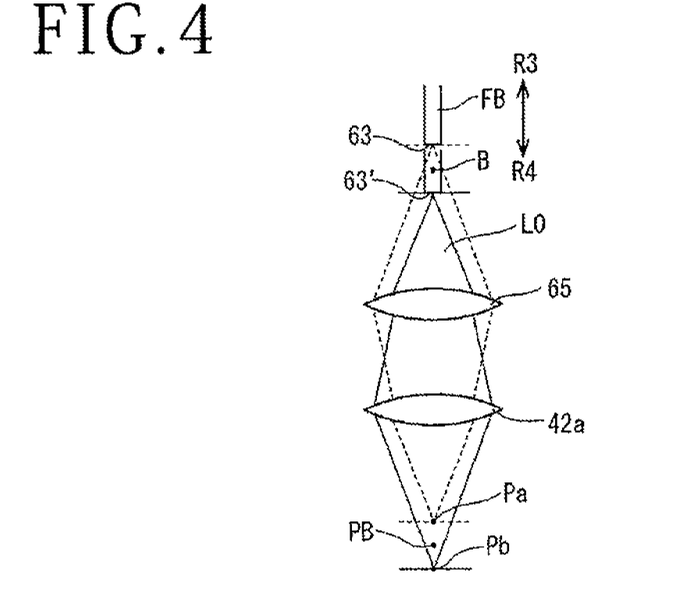
FIG. 4 is a conceptual diagram for explaining the principle of a gap adjusting mechanism depicted in FIG. 2.

The principle of the above-mentioned gap adjusting mechanism 80 will be described referring to FIG. 4. Note that FIG. 4 is a conceptual diagram for explaining the action of the gap adjusting mechanism 80, in which such configurations as the beam splitter 70, the condenser 42, and the optical fiber holder 82 are omitted. A focal point position where the light L0 applied from the end face 63 of the optical fiber FB is made to be parallel light by the collimate lens 65 is made to be a reference position B. In the case where the end face 63 of the optical fiber FB is present at the reference position B, the light passing through the collimate lens 65 and the condenser lens 42*a* forms a condensing point at a position denoted by PB in the figure.

In the case where the end face 63 of the optical fiber FB is moved in the direction indicated by the arrow R3 relative to the reference position B, the light L0 goes from the end face 63 as depicted by a dotted line, and the position of a condensing point Pa formed by the condenser lens 42*a* is moved upward relative to the condensing point PB formed in the case where the end face 63 is present at the reference position B. Conversely, when the end face 63 of the optical fiber FB is moved in the direction indicated by the arrow R4 relative to the reference position B, the light L0 goes from the end face 63 as depicted by solid line, and the position of a condensing point Pb formed by the condenser lens 42*a* is moved downward relative to the above-mentioned condensing point PB. The condensing point position of the light L0 can be adjusted to any position, independently from the condensing point position of the laser beam LB that is being applied while going through the first optical path S1 adjusted by such an action of the gap adjusting mechanism 80. Note that, since the condenser lens 42*a* is a chromatic aberration condenser lens described above, with the end face 63 of the optical fiber FB moved in the vertical direction by the gap adjusting mechanism 80, the whole part of the predetermined range over which the condensing point is formed on the basis of wavelength of the light contained in the light L0 is moved in the vertical direction.

As illustrated in FIG. 3, when the predetermined range over which the condensing point of the light L0 is formed is positioned in the vicinity of the front surface 10*a* of the wafer 10, the light of a predetermined wavelength having formed the condensing point is reflected on the front surface 10*a* of the wafer 10, to generate return light L1. The return light L1 is not wide-band light, but is light mainly containing the predetermined wavelength having formed the condensing point positioned on the front surface 10*a* of the wafer 10 described above.

As can be understood from FIG. 2, the return light L1 reflected by the front surface 10*a* of the wafer 10 reaches the spectroscope 62 by going back through the optical path traveled along by the light L0 applied from the wide band light source 61, namely, the beam splitter 70, the collimate lens 65, and the optical fiber FB, and, as depicted in the figure, is branched by the spectroscope 62 into the third optical path S3 different from the second optical path S2 in which the wide band light source 61 is disposed, to be guided to the Z position detection unit 64. The spectroscope 62 is configured to branch the light passing through the optical fiber FB, and, for example, a known optical circulator may be adopted as the spectroscope 62.

The Z position detection unit 64 includes, for example, a diffraction grating 64*a* that separates and disperses the introduced return light L1 on a wavelength basis, and a line sensor 64*b* that receives the light L2 dispersed by the diffraction grating 64*a* and detects the optical intensity on the wavelength basis according to the position where the light is received. The line sensor 64*b* is a sensor in which a plurality of light receiving elements such as charge-coupled devices (CCDs) is aligned in a row in a predetermined direction, and detects optical intensity by each light receiving element. A signal detected by the line sensor 64*b* is transmitted to the control unit 100, and the wavelength and the optical intensity of the return light L1 are detected based on the signal detected by the Z position detection unit 64.

Figure 6A:
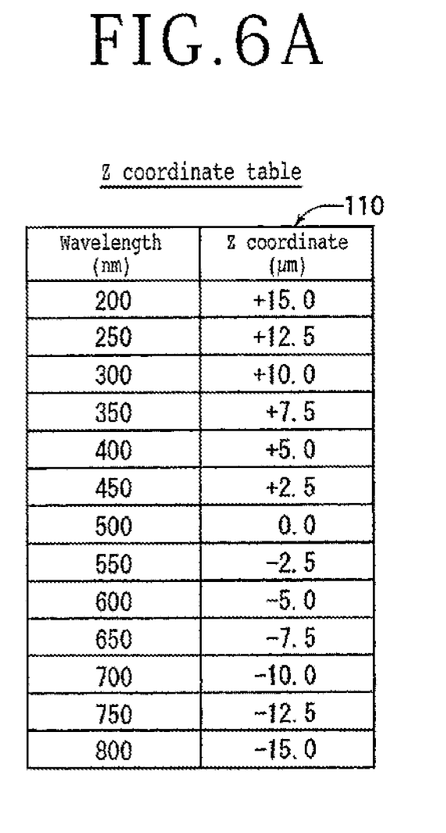
FIG. 6A is a Z coordinate table stored in a control unit.
Figure 6B:
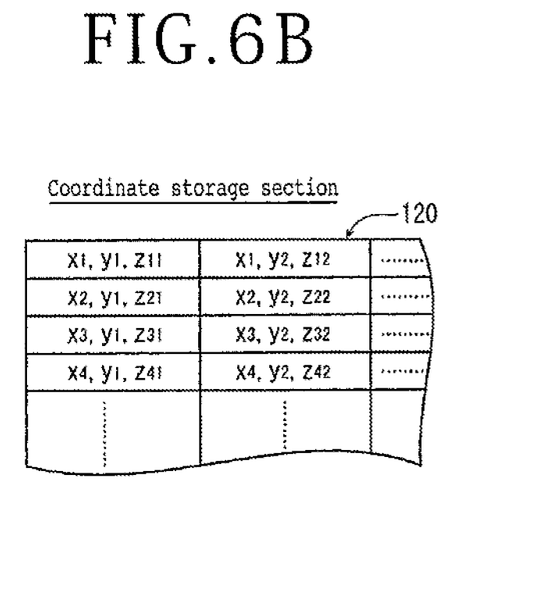
FIG. 6B is a table stored in a Z coordinate storage section of the control unit.

The control unit 100 of the present embodiment includes a Z coordinate table 110 to be used when detecting the Z position by the Z position detection unit 64, and a coordinate storage section 120 in which the Z position (Z coordinate) in the Z-axis direction of the front surface 10*a* of the wafer 10 detected is stored in correlation with an X-axis coordinate and a Y-axis coordinate detected by the X-axis direction feeding amount detection means 28 and the Y-axis direction feeding amount detection means 38. The control unit 100 produces a function of controlling the condenser moving mechanism 43 for moving the condensing point position of the condenser 42 following up to the Z position stored in the coordinate storage section 120, and applying laser processing to the wafer 10 held by the holding unit 22.

The laser processing apparatus 2 of the present embodiment generally has the configuration as described above, and the procedure of laser processing applied to the wafer 10 as a workpiece by use of the laser processing apparatus 2 will be described below.

At the time of carrying out laser processing by the laser processing apparatus 2 illustrated in FIG. 1 described above, the wafer 10 supported on the annular frame F through the adhesive tape T is prepared, is placed on the chuck table 34, and is suction held by operating the suction means not illustrated.

Next, the feeding mechanism 23 is operated to position the chuck table 34 directly under the imaging unit 6, the surface of the wafer 10 is imaged, and image processing such as pattern matching is conducted, to detect the position of the street 12 on the wafer 10 to which the laser beam LB is to be applied (alignment). After the alignment is performed, the chuck table 34 is further moved, and an end portion of the street 12 where laser processing is to be started on the wafer 10 is positioned directly under the condenser 42.

When the processing starting position on the wafer 10 is positioned directly under the condenser 42, the condenser moving mechanism 43 is operated based on a control signal from the control unit 100, and the condensing point P0 formed by the light of a wavelength of 500 nm, of the condensing point of the light L0 condensed by the condenser lens 42*a* of the condenser 42, is formed at a height above the front surface 10*a* of the wafer 10 based on design information (see FIG. 3). In this instance, in the gap adjusting mechanism 80, the end face 63 of the optical fiber FB is positioned at the reference position at which the light L0 applied from the end face 63 of the optical fiber FB is made to be parallel light by the collimate lens 65, and the end face 63 is accurately positioned at a position according to a thickness on design basis of the wafer 10. Note that the X coordinate and Y coordinate of the processing starting position are specified by the X-axis direction feeding amount detection means 28 and the Y-axis direction feeding amount detection means 38, and is, for example, $(X_1, Y_1)$.

Incidentally, there may be slight variableness in the thickness of the wafer 10 according to position, or the wafer 10 may have undulation. Therefore, as described above, even if the condensing point P0 of the light condensed by the condenser 42 is positioned at the position according to the thickness of the wafer 10 on design basis, the condensing point P0 may not necessarily be positioned on the front surface 10a of the wafer 10 in practice.

Here, in the present embodiment, the wide band light source 61 is operated and the condenser moving mechanism 43 is operated, to apply light L0 which is white light. As described above, the light L0 applied from the wide band light source 61 is guided to the condenser lens 42a through the second optical path S2, the beam splitter 70, and the first optical path S1, and forms a condensing point in the vicinity of the front surface 10a of the wafer 10. Since the condenser lens 42a is a chromatic aberration condenser lens, the light L0 forms condensing points at different positions over a predetermined width on the optical axis of the condenser lens 42a according to the length of each of wavelengths constituting the light L0 over a predetermined range inclusive of the front surface 10a of the wafer 10 held by the chuck table 34. In view of this, as illustrated in FIG. 3, in order to accurately position the condensing point P0 at the position where the front surface 10a of the wafer 10 is present, the condenser moving mechanism 43 is adjusted such that the light of the wavelength (500 nm) having formed the condensing point at the position denoted by P0 is most strongly reflected.

Figure 5:
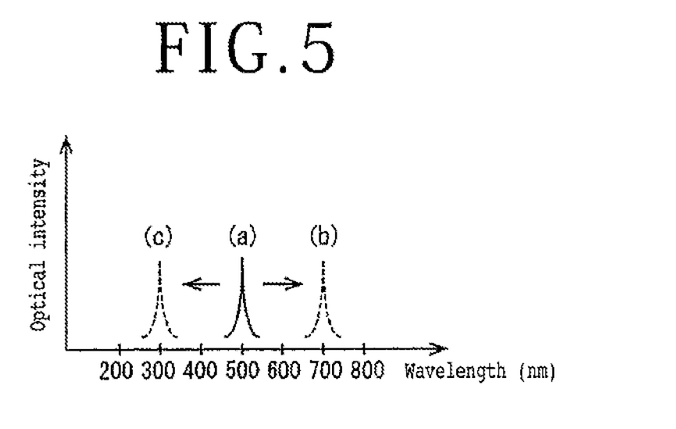
FIG. 5 is a conceptual diagram depicting a transition example of a waveform detected by a Z position detection unit depicted in FIG. 2.

The return light L1 reflected at the position denoted by P0 is guided to the spectroscope 62 through the first optical path S1 and the second optical path S2, and the return light L1 branched to the third optical path S3 and guided to the Z position detection unit 64 passes through the diffraction grating 64a of the Z position detection unit 64, is thereby made to be dispersed light L2 dispersed according to the length of wavelength, and is applied to the line sensor 64b. Here, in the case where the dispersed light L2 is guided to the Z position detection unit 64, since the dispersed light L2 is not wide-band light but is light obtained by strongly reflecting the light of a wavelength (500 nm) having formed the condensing point at the position denoted by P0 in the figure, the optical intensity signal of the dispersed light L2 applied to the line sensor 64b is transmitted to the control unit 100, to form a waveform (indicated by solid line) depicted at (a) in FIG. 5.

When a peak is formed by the dispersed light L2 at a position corresponding to a wavelength of 500 nm as mentioned above, the Z coordinate table 110 depicted in FIG. 6A, which has been preliminarily stored in the control unit 100, is referred to. The Z coordinate table 110 is a table in which wavelengths at which peaks of a waveform detected by the line sensor 64b appear and Z coordinates corresponding to the wavelengths are recorded. In the case where the wavelength at which a peak of a waveform formed by the return light L1 reflected at $(X_1, Y_1)$ is 500 nm, it is detected, by referring to the Z coordinate table 110, that the Z coordinate $(Z_{11})$ is "0.0 µm." When the value of $Z_{11}$ is detected in this way, each value is stored at $(X_1, Y_1, Z_{11})$ of the coordinate storage section 120 depicted in FIG. 6B prepared in the control unit 100.

Next, the X-axis feeding mechanism 50 is operated to feed the chuck table 34 by a predetermined spacing in the X-axis direction, whereby the next Z position measuring point $(X_2, Y_1)$ is positioned directly under the condenser 42. In this instance, the return light L1 reflected at $(X_2, Y_1)$ is guided into the Z position detection unit 64, and the dispersed light L2 is guided into the line sensor 64b. In the case where the waveform formed by the line sensor 64b in this instance is a waveform (indicated by a dotted line) depicted at (b) in FIG. 5, it is detected that the condensing point formed by a wavelength of 700 nm is positioned on the front surface 10a of the wafer 10, and, by referring to the Z coordinate table 110 depicted in FIG. 6A, it is detected that the Z coordinate value $(Z_{21})$ at $(X_2, Y_1)$ is "−10.0 µm." When the value of $Z_{21}$ is detected in this way, each value is stored at $(X_2, Y_1, Z_{21})$ of the coordinate storage section 120 of the control unit 100.

Further, the X-axis feeding mechanism 50 is operated to feed the chuck table 34 by a predetermined spacing in the X-axis direction, and the next Z position measuring point $(X_3, Y_1)$ is positioned at the condenser 42. In this instance, the return light L1 reflected at $(X_3, Y_1)$ is guided into the Z position detection unit 64, and the dispersed light L2 is guided into the line sensor 64b. In the case where the waveform formed by the line sensor 64b in this instance is a waveform (indicated by a dotted line) depicted at (c) in FIG. 5, it is detected that the condensing point formed by a wavelength of 300 nm is positioned on the front surface 10a of the wafer 10, and, by referring to the Z coordinate table 110 depicted in FIG. 6A, it is detected that the Z coordinate value $(Z_{31})$ at $(X_3, Y_1)$ is "+10.0 µm." When the value of $Z_{31}$ is detected in this way, each coordinate value is stored at $(X_3, Y_1, Z_{31})$ of the coordinate storage section 120 of the control unit 100.

In the above-mentioned manner, while the chuck table 34 is fed by the predetermined spacing in the X-axis direction, the Z position is detected, and the Z position is stored in the coordinate storage section 120 in the state of being correlated with the X coordinate and the Y coordinate. After the Z position is detected and stored along the whole region of one street 12, the Y-axis feeding mechanism 52 is operated to position the adjacent street 12 at a position directly under the condenser 42, then, similarly to the above, the Z position corresponding to the X coordinate and the Y coordinate is detected, and each value is stored in the coordinate storage section 120 as depicted in FIG. 6B. Such a measurement is conducted over the whole region of the wafer 10, whereby the Z coordinate, or the thickness, can be detected over the whole region of the front surface 10a of the wafer 10. Note that since variability in the thickness of the wafer 10 does not generally change suddenly, the predetermined spacing in detection of the Z position may be, for example, the width between the adjacent streets 12, and, for a Z position between the adjacent streets 12, an estimated value obtained by carrying out interpolation calculation or the like may be used.

With the above-mentioned configuration, it is ensured that, even when variability in thickness or undulation is present in the wafer 10 or when a laminated matter is present on the front surface 10a of the wafer 10, the height of the front surface 10a of the wafer 10 can be measured properly, and measurement accuracy is enhanced, without being influenced by disturbance, as in the case of using a spectral interference waveform. Further, since the height position is measured by the return light L1 at the position where the condensing point is formed, favorable measurement is possible even in the case of measuring the height in a narrow region, such as at the time of measuring the height position of the street 12.

After the Z positions over the whole region of the front surface 10*a* of the wafer 10 are stored in the state of being correlated with the X coordinates and the Y coordinates described above, a laser beam LB is applied to the wafer 10 by the laser beam applying unit 4, to perform laser processing. In this instance, the condenser moving mechanism 43 is operated based on the Z position preliminarily stored in the coordinate storage section 120, whereby the condenser 42 is advanced or retracted in the Z-axis direction. More specifically, the laser processing apparatus 2 in the present embodiment operates the X-axis feeding mechanism 50 and the Y-axis feeding mechanism 52 to move the chuck table 34, positions the condensing point of the laser beam LB of such a wavelength (1,340 nm) as to be transmitted through the wafer 10 at a position in a predetermined depth (for example, 50 μm) from the front surface 10*a* of the wafer 10, and forms a modified layer. In this case, while the X coordinate and the Y coordinate of the applying position of the laser beam LB are detected by the X-axis direction feeding amount detection means 28 and the Y-axis direction feeding amount detection means 38, the height of the front surface 10*a* of the wafer 10 to be a reference in forming the modified layer is set to the Z position stored in the coordinate storage section 120 in the state of being correlated with the X coordinate and the Y coordinate. As a result, the condensing point of the laser beam LB can be accurately positioned at the position in the predetermined depth (50 μm) from the front surface 10*a* of the wafer 10, over the whole region of the wafer 10.

Figure 7A:
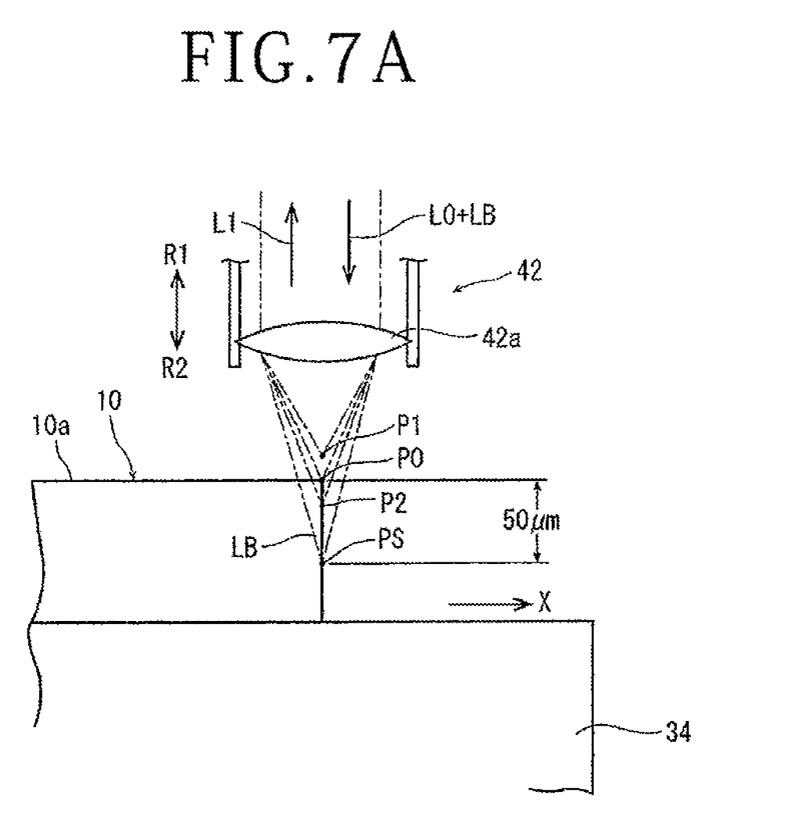
FIG. 7A is a side view depicting a manner in which laser processing is conducted while the Z position is detected.
Figure 7B:
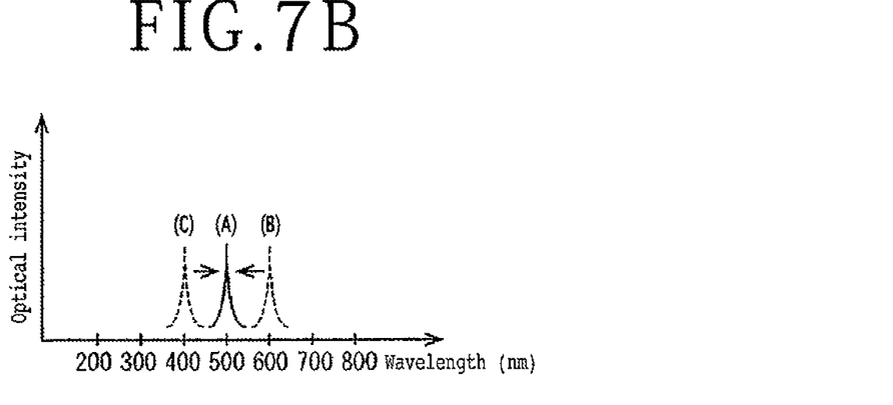
FIG. 7B is a conceptual diagram depicting a transition example of a waveform detected by the Z position detection unit when laser processing depicted in FIG. 7A is carried out.

The present invention is not limited to the above-described embodiment, and various modifications are provided. In the above embodiment, an example has been described in which, before carrying out the laser processing of the wafer 10, the Z position (Z coordinate) at each measuring point on the front surface 10*a* of the wafer 10 is preliminarily detected, the Z positions are stored in the coordinate storage section 120 of the control unit 100 in the state of being correlated with the X coordinates and the Y coordinates, and laser processing is conducted while the condenser moving mechanism 43 is operated based on the Z position stored in the coordinate storage section 120. However, the procedure of laser processing conducted based on the present invention is not limited to this. Referring to FIG. 7A and FIG. 7B as well, other embodiments of laser processing conducted using the above-described laser processing apparatus will be described below.

As illustrated in FIG. 2, the beam splitter 70 is disposed in the optical system constituting the laser processing apparatus 2, and the beam splitter 70, while reflecting the laser beam LB of a wavelength of 1,340 nm, transmits the light L0 constituted of other wavelengths (other than 1,300 to 1,400 nm). Here, even when the laser beam LB for forming a modified layer inside the wafer 10 is applied to the wafer 10, light of wavelengths other than the reflected light of the laser beam LB is not emitted from the front surface of the wafer 10. Therefore, even when wide-band light L0 is simultaneously applied from the wide band light source 61 while the laser beam LB is applied to perform laser processing, it is possible to detect the height of the wafer 10. By utilizing this, the control unit 100 can control the condenser moving mechanism 43 following up to the position in the Z-axis direction detected by the Z position detection unit 64, and can process the wafer 10 held by the chuck table 34 of the holding unit 22. The procedure will be described more specifically below.

In the case of performing laser processing for forming a modified layer inside the wafer 10 by the present embodiment, first, the condenser moving mechanism 43 is operated to position a condensing point position PS of the laser beam LB at a predetermined depth position from the front surface 10*a* of the wafer 10, for example, at a depth position of 50 μm from the front surface 10*a*, as depicted in FIG. 7A. Further, by operating the gap adjusting mechanism 80, a center position P0 of a predetermined range on the optical axis where the condensing point is formed by the light L0 applied by the wide band light source 61 is adjusted to be 50 μm above the condensing point position PS of the laser beam LB. The center of the range where the condensing point is formed by the light L0 is a condensing point formed by the light of a wavelength of 500 nm. Note that, in the case where the position where the modified layer is to be formed is not the depth position of 50 μm from the front surface 10*a* of the wafer 10, the gap adjusting mechanism 80 is operated according to the depth position, to adjust the center position P0 of the predetermined range on the optical axis of the condenser lens 42*a* where the condensing point is formed by the light L0.

After the position of the condensing point P0 is adjusted by operating the gap adjusting mechanism 80, the X-axis feeding mechanism 50 and the Y-axis feeding mechanism 52 are operated to move the chuck table 34, thereby positioning the wafer 10 directly under the imaging unit 6, the surface of the wafer 10 is imaged, and image processing such as pattern matching is conducted, to perform alignment between the to-be-processed position (street 12) on the wafer 10 and the laser beam applying position of the laser beam applied from the condenser 42 of the laser beam applying unit 4. After the alignment is carried out, the chuck table 34 is further moved, to position an end portion of the street at which to start laser processing on the wafer 10 at a position directly under the condenser 42.

After the position where the laser processing is to be started is positioned directly under the condenser 42, the wide band light source 61 is operated, to apply light L0 which is white light. The light L0 applied from the wide band light source 61 is guided to the condenser lens 42*a* through the second optical path S2, the beam splitter 70, and the first optical path S1, and forms a condensing point in the vicinity of the front surface 10*a* of the wafer 10. Due to the condenser lens 42*a* being a chromatic aberration condenser lens, the light L0 forms condensing points at different positions over a predetermined width on the optical axis of the condenser lens 42*a* according to the length of each of wavelengths constituting the light L0, in the predetermined range inclusive of the front surface 10*a* of the wafer 10 held by the chuck table 34.

The laser processing of the present embodiment is configured such that the X-axis feeding mechanism 50 and the Y-axis feeding mechanism 52 are operated to move the chuck table 34, and a condensing point of the laser beam LB of such a wavelength (1,340 nm) as to be transmitted through the wafer 10 is positioned at a depth position of 50 μm from the front surface 10*a* of the wafer 10, to thereby form the modified layer. In this instance, while the X coordinate and the Y coordinate of the applying position of the laser beam LB are detected by the X-axis direction feeding amount detection means 28 and the Y-axis direction feeding amount detection means 38, the condensing point PS is positioned at a position where the modified layer is to be formed. Here, as depicted in FIG. 7A, in the case where the condensing point P0 is positioned at the position where the front surface 10a of the wafer 10 is present, the light of the wavelength (500 nm) having formed the condensing point at the position denoted by P0 is most strongly reflected, to form return light L1. The return light L1 goes back through the first optical path S1, the beam splitter 70, and the second optical path S2, is then spectrally dispersed by the spectroscope 62, and is guided to the Z position detection unit 64, resulting in the detection, as depicted in FIG. 7B, for example, of a waveform (see (A) in the figure) forming a peak value at the position of a wavelength of 500 nm by the return light L1.

The position where the condensing point P0 is formed by a wavelength of 500 nm and the position where the condensing point PS of the laser beam LB is formed are adjusted to be spaced by 50 μm by the gap adjusting mechanism 80 described above. Therefore, when the laser beam LB is applied in the above-mentioned state in which the condensing point P0 is positioned at the front surface 10a of the wafer 10, it is possible to form the modified layer at the desired position, i.e., at the depth position of 50 μm from the front surface 10a of the wafer 10.

When laser processing is made to proceed along the street 12, the height of the front surface 10a may vary, since variability in thickness or undulation or the like is present in the wafer 10. In the case where the height of the front surface 10a is changed, for example, to a lower side, the peak of the waveform detected by the Z position detection unit 64 moves toward a longer wavelength side, as indicated by a dotted line (B) in FIG. 7B. If the peak position of the waveform is changed to the position of a wavelength of 600 nm, it means that the height of the front surface 10a of the wafer 10 is deviated by −5.0 μm (by 5.0 μm toward the lower side), as can be understood by referring to the Z coordinate table 110 in FIG. 6A. When the laser processing is continued in this condition, therefore, the condensing point PS of the laser beam LB forming the modified layer is formed at a position of 45 μm from the front surface 10a of the wafer 10, so that the modified layer is not formed at the desired position. Here, the control unit 100, upon detecting that the peak position of the waveform detected by the Z position detection unit 64 has been changed to the position of a wavelength of 600 nm, operates the condenser moving mechanism 43 to lower the position of the condenser 42 by 5 μm. As a result, the position where the light L0 and the laser beam LB are condensed by the condenser 42 is, as a whole, lowered by 5 μm, and the peak position of the waveform detected by the Z position detection unit 64 is returned from the position denoted by (B) to the position denoted by (A), as indicated by an arrow in FIG. 7B. In other words, the condensing point PS of the laser beam LB is controlled, following up to the Z position of the front surface 10a of the wafer 10 detected by the Z position detection unit 64, whereby the modified layer is continuously formed at a depth position of 50 μm from the front surface 10a of the wafer 10.

In addition, when the laser processing is conducted, if the peak of the waveform detected by the Z position detection unit 64 would be moved toward the shorter wavelength side as indicated by a dotted line (C) in FIG. 7B and the peak position of the waveform would be changed to the position of a wavelength of 400 nm, it means that the height of the front surface 10a of the wafer 10 is deviated by +5.0 μm, as can be understood by referring to the Z coordinate table 110 in FIG. 6A. When the laser processing is continued in this condition, therefore, the condensing point PS of the laser beam LB forming the modified layer is formed at a depth position of 55 μm from the front surface 10a of the wafer 10. Here, the control unit 100, upon detecting that the peak position of the waveform detected by the Z position detection unit 64 has been changed to the position of a wavelength of 400 nm, operates the condenser moving mechanism 43 to raise the position of the condenser 42 by 5 μm. As a result, the position where the light L0 and the laser beam LB are condensed by the condenser 42 is, as a whole, raised by 5 μm, and the peak position of the waveform detected by the Z position detection unit 64 is returned from the position denoted by (C) in FIG. 7B to the position denoted by (A). In other words, the condensing point PS of the laser beam LB is controlled, following up to the Z position of the front surface 10a of the wafer 10 detected by the Z position detection unit 64, whereby the modified layer is continuously formed at a depth position of 50 μm from the front surface 10a of the wafer 10.

By detecting the Z position of the front surface 10a of the wafer 10 and operating the condenser moving mechanism 43 to control such that the peak of the waveform detected by the Z position detection unit 64 is normally kept at the position indicated by solid line (A) in this way, the position of the condensing point PS where the modified layer is to be formed can be accurately positioned at the depth position of 50 μm from the front surface 10a, and the modified layer can be formed at the desired position.

Note that, while an example in which the present invention is applied to the laser processing apparatus for forming the modified layer inside the wafer 10 has been described in the above embodiment, the present invention is not limited to this and is also applicable to a laser processing apparatus that positions the condensing point of a laser beam having such a wavelength as to be absorbed in the wafer 10 at the front surface 10a of the wafer 10, to apply ablation processing to the wafer 10. In that case, it is preferable that, by application of the present invention, the Z position of the front surface 10a of the wafer 10 is preliminarily detected and stored in the Z coordinate storage section 120 of the control unit 100, and laser processing is conducted based on the Z position stored in the Z coordinate storage section 120.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A laser processing apparatus comprising:
a chuck table that holds a workpiece;
laser beam applying unit that applies a laser beam to the workpiece held by the chuck table to process the workpiece;
an X-axis feeding mechanism that performs relative processing feeding of the chuck table and the laser beam applying unit in an X-axis direction;
a Y-axis feeding mechanism that performs relative processing feeding of the chuck table and the laser beam applying unit in a Y-axis direction orthogonal to the X-axis direction; and
a control unit,
wherein the laser beam applying unit includes
a laser oscillator that oscillates laser,
a condenser that condenses the laser beam emitted from the laser oscillator onto the workpiece held by the chuck table at any position in a Z-axis direction orthogonal to the X-axis direction and the Y-axis direction, a collimate lens and a beam splitter disposed on a first optical path connecting the laser oscillator and the condenser, a wide band light source disposed on a second optical path branched by the beam splitter, an optical fiber connected to the wide band light source, said optical fiber configured to direct wide band light at the beam splitter, a gap adjusting mechanism including a holder attached to a part of the optical fiber, said gap adjusting mechanism configured to move the optical fiber to adjust a position of the end of the optical fiber relative to the collimate lens, and said gap adjusting mechanism including a motor coupled to the holder where the motor adjusts the position of the holder and the optical fiber, a spectroscope that is disposed between the wide band light source and the beam splitter and that branches the laser beam from the second optical path to a third optical path, a Z position detection unit that is disposed on the third optical path branched by the spectroscope and that detects a Z position in the Z-axis direction of the workpiece according to an intensity of light corresponding to a wavelength of return light that is generated when the light from the wide band light source is condensed by the condenser and is reflected by the workpiece held by the chuck table, and a condenser moving mechanism that moves the condenser in the Z-axis direction according to the Z position.

2. The laser processing apparatus according to claim 1, wherein the second optical path includes the optical fiber, the light from the wide band light source that is guided by the optical fiber, the light applied from an end face of the optical fiber is guided through a collimate lens to the beam splitter that transmits the light, the gap adjusting mechanism, and a condensing position of the light of the wide band light source condensed by the condenser that is adjusted by the gap adjusting mechanism.

3. The laser processing apparatus according to claim 1, wherein the laser oscillator oscillates laser of such a wavelength as to be transmitted through the workpiece, and the condenser positions a condensing point inside the workpiece to form a modified layer.

4. The laser processing apparatus according to claim 1, wherein the control unit includes a coordinate storage section that stores the Z position in the Z-axis direction of the workpiece detected by the Z position detection unit in a Z-axis coordinate together with X-axis and Y-axis coordinates, and the control unit controls the condenser moving mechanism, based on the coordinates stored in the coordinate storage section, to process the workpiece held by the chuck table.

5. The laser processing apparatus according to claim 1, wherein the control unit controls the condenser moving mechanism following up to the Z position in the Z-axis direction detected by the Z position detection unit, to process the workpiece held by the chuck table.

* * * * *